United States Patent Office 2,845,370

Patented July 29, 1958

2,845,370

SEMI-CONDUCTOR CRYSTAL RECTIFIERS

Pierre Raoul Roger Aigrain, Paris, France, assignor to International Standard Electric Corporation, New York, N. Y., a corporation of Delaware No Drawing. Application August 5, 1953
Serial No. 372,611

Claims priority, application France August 7, 1952

2 Claims. (Cl. 148—1.5)

The present invention relates to semi-conductor translators and to the methods of making them. More particularly the present invention relates to the so-called "point contact" or "cat whisker" type.

While the present invention is applied particularly to such devices utilizing germanium crystal and while reference is made to this substance in the following description, it should be understood that this invention is applicable also to crystal translators utilizing silicon crystal or any other substance having similar properties.

Recent investigations have shown that the so-called "rectifying barrier" layer appears at the junction of a negative mass of germanium (N) with a positive region (P) adjacent the point of the cat whisker. This region is formed during the so-called "forming" operation, probably by the diffustion of superficial holes at temperatures above 550° C. towards the inside of the germanium mass. This has been described in a doctorate thesis by the present inventor available at the University of Paris since 1950.

The spreading of the P-type germanium region resulting from this diffusion diminishes the inverse resistance of the rectifier thus formed without diminishing its direct resistance which is limited by the point contact. Furthermore, the germanium utilized must be sufficiently pure to lend itself to conversion from N-type to P-type by thermal treatment.

An object of the present invention is the provision of a process whereby the conversion between the N-type and the P-type may be both activated and controlled so that the diffusion is reduced. Furthermore by the process of the present invention use may be made of a less highly purified germanium than that now required in the manufacture of such devices.

In accordance with the main feature of the present invention, a region is formed adjacent the contact point or cat whisker, said contact point presenting donor impurities which produce in the region a conductivity opposite to that of the mass of the germanium or other crystal, this being accomplished at a temperature which does not exceed that in transforming from the N-type to the P-type, namely approximately 500 to 550° C., for germanium, and this operation takes place in the absence of oxygen or any other agent likely to cause the undesirable transformation in the germanium.

According to other features of the present invention, the germanium may be first prepared by introducing therein holes by thermal treatment, which holes disappear during the above-mentioned transformation operation, but which will facilitate said transformation while they are present. It is also possible in carrying out our invention to first treat the surface of germanium with a produce which increases the densities of the impurities lending N-type conductivity, for example, using $SbCl_5$.

The practice of the foregoing technique results in semiconductor translating devices, such as retifiers or translators in which the region of the first type of conductivity, which is opposed to the second type conductivity of the rest of the crystal, is closely limited around the contact point and which rectifiers have high inverse resistance.

The above-mentioned and other features and objects of this invention and the manner of attaining them will become more apparent and the invention itself will be best understood, by reference to the following description of an embodiment of the invention.

The translator which may be a rectifier or a transistor includes at least two metallic conductors, on one of which the previously polished and chemical surface treated germanium is soldered, and the other conductor of which is a point of preferably resilient metal such as tungsten, rhodiated platinum, phosphorous bronze etc., which has been electrolytically plated with a layer of indium, gold or other donor material capable of penetrating into the germanium to constitute therein an impurity of the desired type, such as for example the P-type. The germanium crystal and the two conductors are sealed in a glass vessel or similar gas type vessel which may have introduced therein a small quantity of phosphorous or other material intended to absorb the oxygen therein.

The sealed body is brought to a temperature sufficiently high so as not to damage the soldering or seals but at which the germanium loses its rectifying property, that is the crystal becomes intrinsic. During this sealing operation, care must be taken to assure that no electric voltage is applied to the crystal. After this condition has been reached, there is applied in series with the crystal a continuous voltage producing an electric current that raises the temperature of the germanium to a peak of about 500° C., without exceeding 550° C. This treatment is continued for sufficient time to obtain, after cooling, the desired characteristics. As the treatment is continued the resistance in both directions will diminish and this must be taken into consideration in determining the length of the treatment.

While I have described above the principles of my invention in connection with specific apparatus, it is to be clearly understood that this description is made only by way of example and not as a limitation to the scope of my invention as set forth in the objects thereof and in the accompanying claims.

I claim:

1. A process for producing a P–N junction in a point-contact germanium semiconductor device of one conductivity type, the point contact containing an impurity to produce a conductivity opposite to that of the semiconductor, comprising heating said semiconductor device to a temperature at which the semiconductor becomes intrinsic, and then applying current of sufficient magnitude through the point contact and semiconductor to heat the semiconductor to a temperature between 500° C. and 550° C., whereby the impurity on said point contact diffuses into a limited region of said semiconductor forming a P–N junction.

2. The process according to claim 1, wherein said heat treatments are conducted in an atmosphere substantially free of oxygen.

References Cited in the file of this patent

UNITED STATES PATENTS

| | | |
|---|---|---|
| 2,602,211 | Scaff et al. | July 8, 1952 |
| 2,671,156 | Douglas et al. | Mar. 2, 1954 |
| 2,697,269 | Fuller | Dec. 21, 1954 |